S. F. BRIGGS AND E. W. JACOBI.
LOCKING SWITCH.
APPLICATION FILED JULY 23, 1920.

1,437,716. Patented Dec. 5, 1922.
3 SHEETS—SHEET 1.

WITNESSES
H. D. Chase
C. L. Waal

INVENTORS
Stephen F. Briggs &
Edward W. Jacobi
By R. S. Caldwell
ATTORNEY

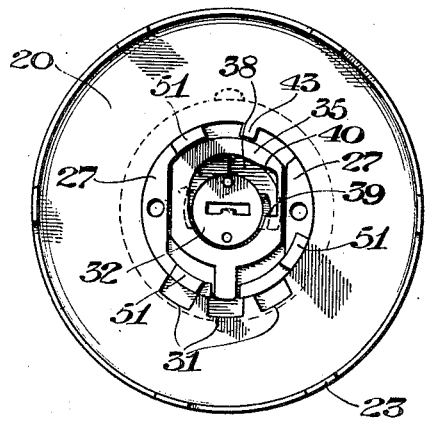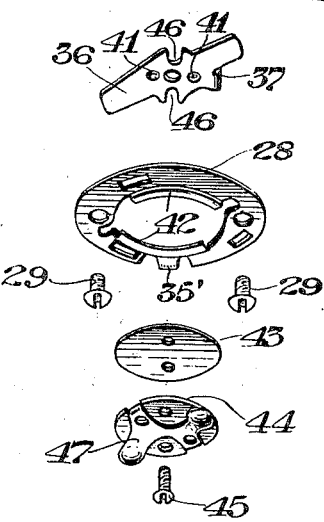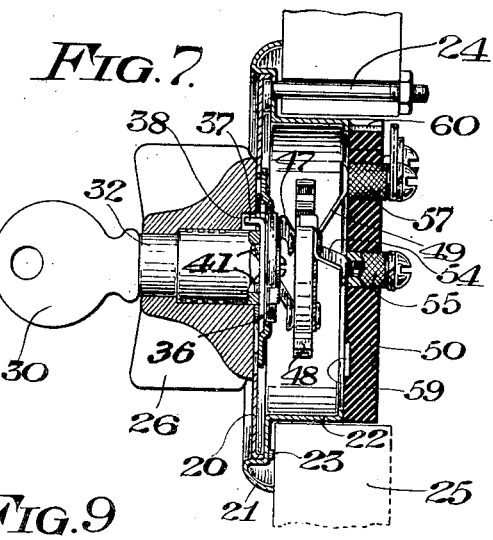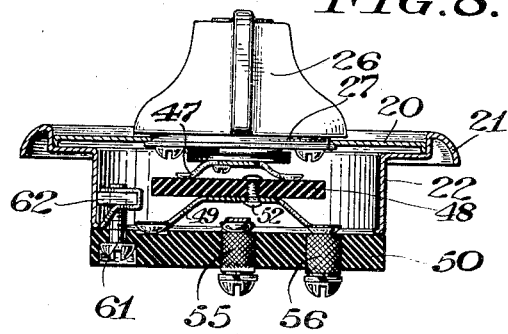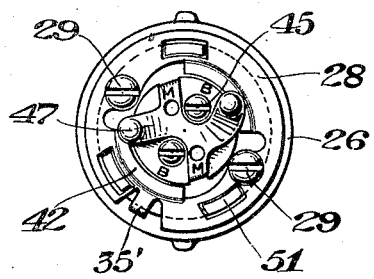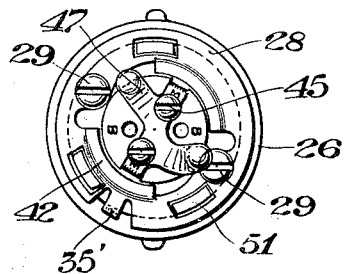

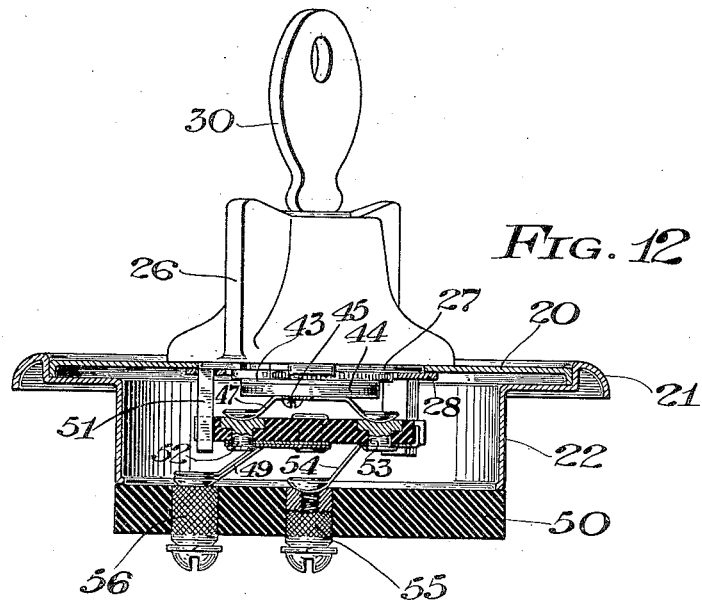
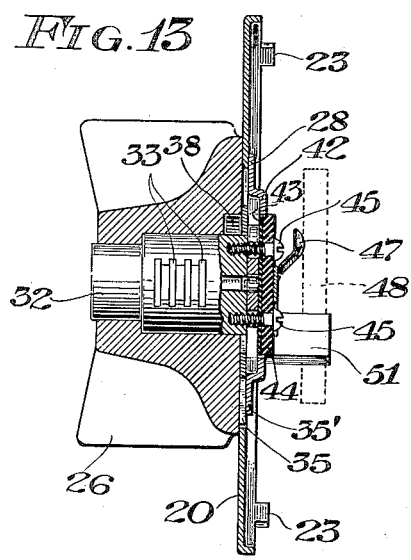
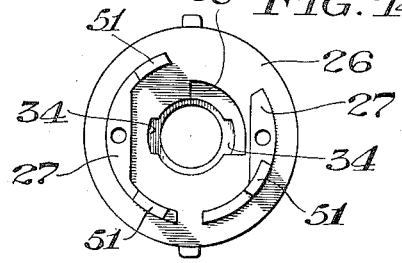
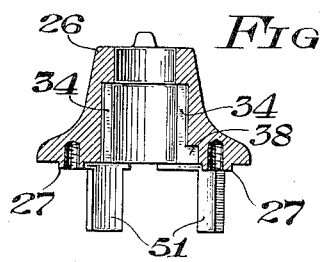

Patented Dec. 5, 1922.

1,437,716

UNITED STATES PATENT OFFICE.

STEPHEN F. BRIGGS AND EDWARD N. JACOBI, OF MILWAUKEE, WISCONSIN, ASSIGNORS TO BRIGGS & STRATTON COMPANY, OF MILWAUKEE, WISCONSIN, A CORPORATION OF WISCONSIN.

LOCKING SWITCH.

Application filed July 23, 1920. Serial No. 398,558.

*To all whom it may concern:*

Be it known that we, STEPHEN F. BRIGGS and EDWARD N. JACOBI, citizens of the United States, and residents of Milwaukee, in the county of Milwaukee and State of Wisconsin, have invented new and useful Improvements in Locking Switches, of which the following is a description, reference being had to the accompanying drawings, which are a part of this specification.

This invention has for its object to provide a locking switch suitable for controlling the lighting and ignition circuits of automobiles, but capable of general application.

An object of the invention is to provide a handle operated switch member with contacts playing on a terminal head and a key operated second switch member with contacts playing on the first switch member.

An object of the invention is to simplify the construction of locking switches of this type by avoiding the necessity of working parts of one switch passing through working parts of the other switch.

Another object of the invention is to adapt a switch of this character for ready convertibility from a switch to control magneto ignition to a switch for controlling battery ignition.

Another object of the invention is to perfect details of construction to strengthen the device and render it more durable and at the same time to reduce the cost of manufacture thereof.

With the above and other objects in view the invention consists in the locking switch as herein claimed and all equivalents.

Referring to the accompanying drawings in which like characters of reference indicate the same parts in different views:

Fig. 7 is a central sectional view of the complete switch;

Fig. 8 is a similar view on a different sectional plane;

Fig. 9 is a perspective view of parts in their assembling order with relation to the rear end of the switch handle shown in elevation;

Fig. 10 is a view of the switch handle with the ignition switch member in position thereon for battery ignition;

Fig. 11 is a similar view with the ignition switch member in position for magneto ignition;

Fig. 12 is a sectional view of the switch showing the contacting parts of both switch members for establishing the ignition circuit in a battery ignition system;

Fig. 13 is a sectional view of the switch handle showing the lock therefor;

Fig. 14 is a rear view of the switch handle alone; and

Fig. 15 is a sectional view thereof.

Figure 1:
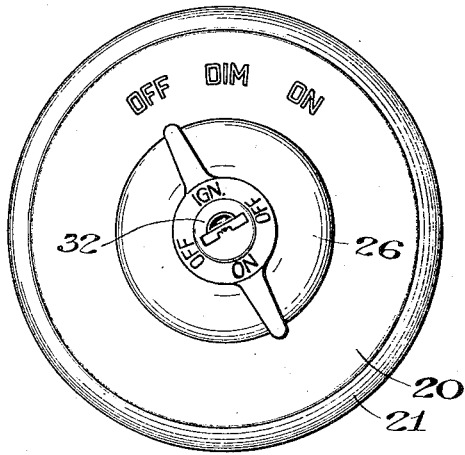
Fig. 1 is a front view of a locking switch constructed in accordance with this invention.

In these drawings 20 indicates a front plate, which is shown to be of disk form with its edges turned rearwardly and fitting within a depression of the flanged rim 21 of a cylindrical switch case 22 and secured therein by having tongues 23 on its edge passing through suitable slots in the flange of the switch case and bent over thereon. Clamping studs 24 pass through openings in the flange of the switch case with their heads flattened to prevent them from turning and by means of the nuts on said studs the switch may be mounted in an opening in the dash or other support 25.

A switch handle 26 is mounted in a central opening of the front plate 20 so as to be capable of being turned therein. Specifically, this rotary mounting of the switch handle in the front plate involves structural features that relate to the locking mechanism. As seen in Fig. 14, the end of the switch handle 26 is in the form of a round flat face having slight projections 27 forming a concentric shoulder to fit within the circular opening of the front plate 20 and a thrust plate 28 of larger diameter than the shoulder 27 is secured to the handle by means of screws 29 and bears against the inner face of the front plate 20 to prevent the removal of the handle and to take the thrust of spring contacts.

The switch handle constitutes a driver for a switch member as will later appear and has several operative positions, in the present instance three, indicated by the words "Off", "Dim" and "On" appearing on the front plate. In order that the switch handle may be locked in any of such positions it is provided with a locking mechanism controlled by a removable key 30 and adapted to engage notches 31 in the edge of the front plate. The key fits in a cylindrical lock barrel 32 which rotatably fits within a shouldered opening in the switch handle and has tumbler slides 33 to project within recesses 34 of said opening when the key is removed. The shape of the key is such, however, that all of the tumblers are withdrawn within the lock barrel when the key is inserted and then the lock barrel is capable of being turned within the switch handle by means of the key. A locking bolt 35 is slidably mounted between the end of the switch handle and the thrust plate 28 and is guided between the parallel edges of the projections 27 with its tongue portion within a gap between said projections 27 and adapted to engage the locking notches 31. A tongue portion 35' cut from the edge of thrust plate 28 bears on the locking bolt tongue to give frictional resistance thereto and prevent accidental movements of the locking bolt. The locking bolt 35 is adapted to slide into and out of its locking engagements with notches 31 and is moved for this purpose by a lock plate 36 fixed on the end of the lock barrel 32 and having a hook-like projection 37, best seen in Fig. 7, passing through the opening of the lock bolt and into a recess 38 of the switch handle, said projection 37 serving by its engagement with shoulders 39 and 40 of the lock bolt to effect such movements as the result of the turning movement of the lock barrel. In order that the lock plate 36 may be conveniently fixed on the end of the lock barrel it is provided with a pair of lugs 41 pressed up from it and fitting within the key slot of the lock barrel, as shown in Fig. 7. The lock plate is held in this position by having its ends confined within arc-shaped hook-like flanges 42 on the edge of the thrust plate 28.

The movements of the switch handle are limited by a stop lug 43 on the edge of the front plate projecting between the switch handle and the thrust plate and engaging stop shoulders formed by the ends of projections 27.

Between the lock plate retaining flanges 42 of thrust plate 28 are a pair of insulating disks 43 and 44 which are secured to the end of the lock barrel by means of screws 45.

The screws 45 pass through notches 46 of the lock plate and serve to clamp it to the end of the lock barrel. The insulating disk 44 has a double contact spring 47 secured to it by having ears bent through notches in the edge of the disk and it will be noted that while the screws 45 are free from engagement with the double contact spring in the arrangement shown in Fig. 10, which is for battery ignition, additional holes are provided for them so that they directly engage the metal of the double contact spring and so make connection therewith and with the lock barrel to constitute a ground connection for magneto ignition, as shown in Fig. 11.

The double contact spring 47 bears at its oppositely directed rounded ends upon the upper surface of an insulating contact disk 48 which in turn carries on its lower face a contact spider 49 with its various round end contact springs bearing on the upper face of the terminal head 50. The contact disk 48 has notches in its edge fitting on driving arms 51 which project from the switch handle and pass through openings in the thrust plate. Three of these arms are shown, though there may be any number. This method of mounting the contact disk compels it to turn with the switch handle, although it is free to yield under the influence of the contact springs above and below it.

Figure 2:
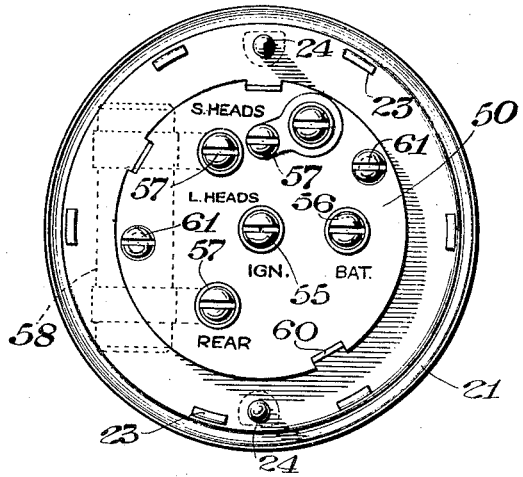
Fig. 2 is a rear view thereof with a dimming resistance shown in dotted lines.

The contact spider 49 is secured to the contact disk 48 by means of rivets 52, one of which is recessed to constitute a contact engaged by one of the arms of the double contact spring 47. Another rivet 53 through the contact disk 48, but free from the spider 49, serves as another contact engaged by the other arm of the double contact spring 47 at the same time that contact 52 is engaged, as shown in Fig. 12. This is the position of the parts when the switch is unlocked, that is, with the key inserted and turned to approximately the plane of the wings of the switch handle. In this position the key cannot be removed on account of the tumblers of the lock barrel being out of register with the recesses 34. In this position also the key registers with the words "Ignition on" appearing on the end of the switch handle, whereas in its other position, in a plane approximately at right angles to the plane of the wings of the switch handle it registers with the word "Off." The rivet 53 above mentioned serves to secure an ignition contact spring 54 to the bottom of the contact disk 48 and said ignition contact spring always contacts with a central terminal stud 55 in the terminal head 50. Another terminal stud 56 marked "Bat." on the back of the terminal head, as shown in Fig. 2, is engaged in all three positions of the switch handle by one of a group of three contact arms of the spider, so that, whatever the position of the switch handle, the "ignition on" position of the key closes the battery ignition circuit form terminal stud 56 through spider 49, rivet 52, double contact spring 47, rivet 53, ignition contact spring 54 and the central terminal stud 55 marked "Ign." on the back of the terminal head, as shown in Fig. 2. It is apparent that in any position of the switch handle the turning of the key to its "off" position, in which it may be removed, not only locks the switch handle in that position but turns the double contact spring 47 through an angle of about ninety degrees, where it will no longer contact with studs 52 and 53 and consequently the ignition circuit will be broken, thereby preventing unauthorized use of the automobile. When the switch is used for controlling magneto ignition the disk 44 is changed from the position shown in Fig. 10 to the position shown in Fig. 11, wherein the screws 45 establish the grounding connection for the double spring contact as previously explained. This brings the contact ends in a line approximately at right angles to their former position, so that instead of bridging the contacts 52 and 53 in the "on" position of the key they are midway between said contacts, but in the "off" position of the key the contact 53 alone is engaged by the double contact spring, thereby connecting the magneto ignition circuit to ground to render the magneto ineffective for ignition purposes, a practice well understood in this art.

Other terminal studs 57, marked "Rear," "L. heads" and "S. heads" are engaged by the arms of the contact spider 49 in the different positions of the switch handle in order to establish connections between the battery and the various lamp connections as indicated in order to effect the desired lighting combinations. The "S. heads" terminal stud is shown as provided with an extension in order to remove its binding post screw from the binding post screw of the "L. heads" terminal stud. In cases where the automobile is not provided with separate small headlight circuit a dimming resistance 58, shown by dotted line in Fig. 2, is connected between the large headlight terminal stud and the rear light terminal stud, so that in the intermediate position of the switch handle circuit will be established through the headlights from the rear light terminal stud by way of the dimming resistance.

Figure 3:
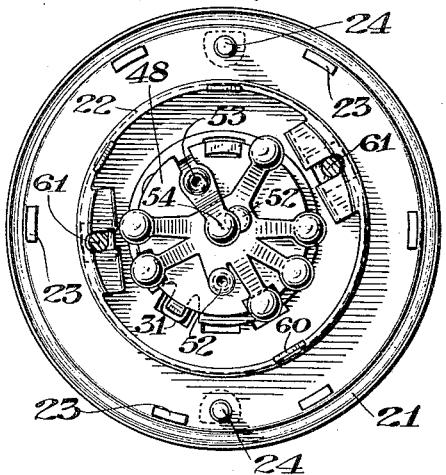
Fig. 3 is a rear view of the switch with the terminal head removed.
Figure 4:
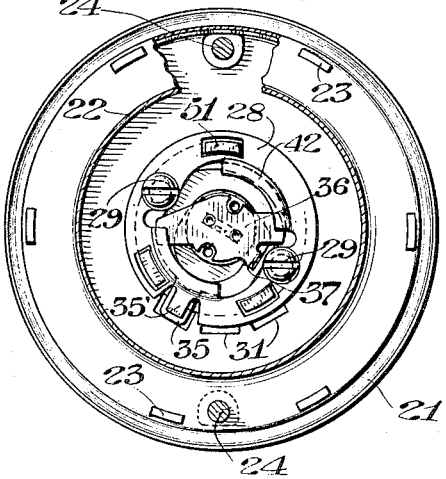
Fig. 4 is a similar view with the switch members removed.
Figure 5:
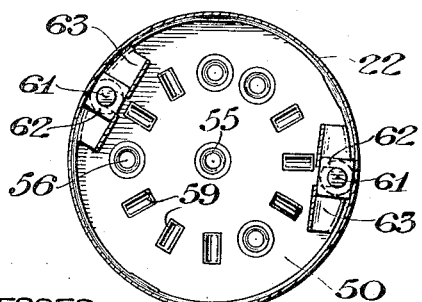
Fig. 5 is a sectional view showing the inner face of the terminal head and the nut housings.
Figure 6:
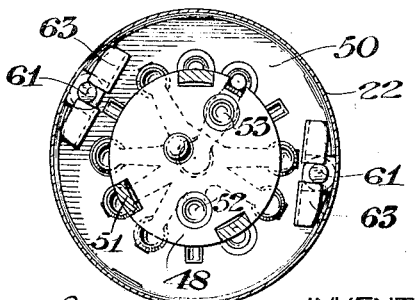
Fig. 6 is a similar view with the lighting switch in place.

The terminal head has recesses 59 formed in its inner face to receive the ends of the spider arms so as to give a detent action to the lighting switch for holding it in its various operative positions. The terminal head has notches in its edge to receive tongues 60 projecting from the edge of the switch case 22, such edge of the switch case being otherwise bent inwardly to bear against the inner face of the terminal head and bolts 61 pass through the terminal head and are threaded in nuts 62 housed within pockets 63 of the switch case for clamping the terminal head to the switch case. These pockets 63 are formed by extensions of the switch case edge bent in the manner shown in Figs. 3, 5 and 8 and serve as clips to hold the nuts in place when the bolts are disconnected therefrom. The nuts are thus held out of the path of the spider arms but sufficiently close to the terminal head to permit of the use of short bolts and standard nuts may be used avoiding the necessity for tapping a thread.

By means of this invention a compact and durable switch structure is produced capable of controlling the lighting and ignition circuits of an automobile, though adapted for other purposes as well, and the locking of the switch is accomplished by means which are well adapted to prevent unauthorized use, the entire switch being strong and durable and not liable to get out of order. The switch being largely composed of sheet metal stampings, is inexpensive to manufacture though it is neat and ornamental in appearance and adapted to provide contrasting surfaces by the exposed portion of the front plate 20, the switch handle and the bezel flange of the switch case.

We desire it to be understood that this invention is not limited to any specific form or arrangement of parts except in so far as such limitations are specified in the claims.

What we claim as new and desire to secure by Letters Patent is:

1. In a switch, a movable switch member, contacts cooperating therewith for changing circuit connections, contacts carried by said switch member, and a second movable switch member cooperating with the contacts carried by the first switch member for changing other circuit connections.

2. In a switch, a terminal head having contacts, a suitably operated switch member having contact springs engaging said contacts and also having contacts, and a suitably operated second switch member having contact springs engaging the contacts of the first mentioned switch member.

3. In a switch, a terminal head having contacts, a suitably operated parallel switch member having contact springs for engaging said contacts and also having contacts, and a suitably operated parallel second switch member having contact springs engaging the contacts of the first mentioned switch member.

4. In a switch, a terminal head having contacts, a suitably operated switch member spaced from the terminal head and provided with contacts, and a second switch member positioned between the first mentioned switch member and the terminal head and having contacts cooperating with the contacts of each.

5. In a switch, a pair of switch members, separate operating means for the switch members, one of which is mounted in the other to move therewith but is capable of relative movement, the switch member of the last mentioned operating means cooperating with contacts on the other switch member, and a terminal head having contacts with which said other switch member cooperates.

6. In a switch, a pair of switch members, one mounted on the back of the other and cooperating with contacts thereof, a terminal head having contacts engaged by the said other switch member, and concentrically arranged operating means for the two switch members.

7. In a switch, a switch case, a switch handle mounted therein, a terminal head mounted on the switch case and having contacts, arms on the switch handle, a switch member fitting between the arms and having contact springs engaging the contacts of the terminal head, a switch operating member rotatably mounted in the switch handle, and a switch member carried thereby and having spring contact engagement with the first mentioned switch member.

8. In a switch, a rotatably mounted switch handle, a switch member carried thereby, a lock barrel mounted within the switch handle, lock mechanism operated thereby for locking the switch handle, and a second switch member carried by the lock barrel and contacting with the first switch member.

9. In a switch, a switch case, a terminal head therefor having contacts, a switch handle mounted in the switch case, a switch member carried by the switch handle and contacting with the terminal head contacts, a lock barrel mounted in the switch handle, a lock mechanism operated thereby for locking the switch handle to the switch case, and a second switch member carried by the lock barrel and contacting with the first switch member.

10. In a switch, a switch handle, a switch member operated thereby, a switch operating means mounted in the switch handle, a second switch member operated thereby and contacting with the first switch member to effect a circuit connection, said switch handle and switch operating means being capable of moving together, and a lock for the switch handle operated by a relative movement between the switch handle and the switch operating means.

11. In a switch, a switch handle, a switch member operated thereby, a switch operating means mounted in the switch handle, a second switch member operated thereby and contacting with the first switch member to effect a circuit connection, said switch handle and said switch operating means being capable of movement together, a removable handle for the switch operating means by which it may be given relative movement, and a lock for the switch handle operated by the relative movement of the switch operating means.

12. In a switch, a switch handle, a switch member operated thereby comprising an insulating disk having a contact spider and a contact spring riveted thereto and the rivets constituting contacts, a switch operating means mounted in the switch handle, a switch member mounted thereon and having contact springs for engaging the said contacts, and a terminal head having contacts engaged by the contact spider and the contact spring.

13. In a switch, a front plate, a switch handle mounted to turn in the front plate, a thrust plate secured to the switch handle and bearing on the back of the front plate, a lock bolt slidably mounted between the thrust plate and the switch handle and adapted to engage notches in the edge of the front plate, a lock barrel fitting in the switch handle, a lock plate secured to the lock barrel and having a projection to engage shoulders on the lock bolt for causing the same to slide as the result of turning movements of the lock barrel, and flanges on the thrust plate engaging the ends of the lock plate for taking the thrust of the lock barrel.

14. In a switch for controlling automobile ignition, a switch operating means adapted to be locked in one position and having another position in which it cannot be locked, an ignition contact, and a switch member adapted for connection with the switch operating means in either of two positions, in one position so as to make connection with the ignition contact when the switch operating member is in position to be locked and in the other position so as to make connection with the ignition contact when the switch operating member is in the position in which it cannot be locked.

15. In a switch for controlling automobile ignition, a suitably mounted switch handle, a lock barrel mounted therein, a switch member operated by the switch handle and provided with contacts, and a second switch member adapted to be mounted on the lock barrel in either of two positions and engaging the contacts on the other switch member for rendering the ignition circuit ineffective when the switch is locked.

16. In a switch, a switch case, a terminal head on the end of the switch case, a tongue bent up from the edge of the switch case to form a clip, a nut held between the clip and the wall of the switch case, and a screw passing through the terminal head and threaded in the nut.

17. In a switch, a switch case, a terminal head on the end of the switch case, tongues bent from the edge of the switch case to form a pair of clips, a nut held between the clips and the wall of the switch case, and a screw passing through the terminal head and between the clips and threaded in the nut.

In testimony whereof, we affix our signatures.

STEPHEN F. BRIGGS.
EDWARD N. JACOBI.